United States Patent [19]

Kenny

[11] 3,926,419

[45] Dec. 16, 1975

[54] COMBINATION CUTLERY AND CUTTING BOARD

[76] Inventor: Edwin J. Kenny, 2661B N. Fratney, Milwaukee, Wis. 53212

[22] Filed: June 12, 1974

[21] Appl. No.: 478,638

[52] U.S. Cl. ................... 269/16; 248/37.6; 269/289
[51] Int. Cl.² ........................................ B25B 11/00
[58] Field of Search......... 211/60 R; 248/37.3, 37.6; 269/15, 16, 289, 302.1; D7/46, 73, 74

[56] References Cited
UNITED STATES PATENTS

| 844,529 | 2/1907 | Meyers | 269/15 |
|---|---|---|---|
| 1,614,342 | 1/1927 | Bleckley | 248/37.6 |
| D233,203 | 10/1974 | Hughes | 269/289 |

FOREIGN PATENTS OR APPLICATIONS

| 591,304 | 8/1947 | United Kingdom | 269/289 |

OTHER PUBLICATIONS

Stein & Blake, Advertisement, Vogue, Nov. 1, 1960, p. 108.

*Primary Examiner*—Roy Lake
*Assistant Examiner*—Mark S. Bicks
*Attorney, Agent, or Firm*—Ronald E. Barry

[57] ABSTRACT

The combination of a cutting board and cutlery set, the board including a juice trough on one side spaced inwardly from the edge to define a cutting surface and a number of elongate recesses provided in a parallel spaced relation on the bottom of the board, the cutlery set including a number of knives and a fork each having a handle having a configuration to fit within a corresponding recess, a cross bar supported on the bottom of said board by a pair of spring coils to bias said cross bar into engagement with the bottom of said board to hold the knives in said recesses, and a supporting post at each corner of the board to provide sufficient space beneath the board for storing the cutlery set.

2 Claims, 4 Drawing Figures

COMBINATION CUTLERY AND CUTTING BOARD

BACKGROUND OF THE INVENTION

Cutting boards and cutlery sets are commonly provided as separate items. The cutting board is generally provided with a juice trough spaced inwardly from the edges of the board to define a cutting surface. The cutlery set is normally stored in a separate board which is stored as a complete unit separate from the cutting board.

SUMMARY OF THE INVENTION

The combination cutlery and cutting board of the present invention provides a unique arrangement for storing a cutlery set on the cutting board. The cutlery set can then be stored with the cutting board thus saving the space normally required for storing a cutlery set. The cutlery set is retained on the board by means of a cross bar which is biased to allow for the easy removal of the cutlery set from the board. One of the unique features of this invention is the spring coil arrangement for holding the knives in position which allows for easy removal and replacement of the knives in the recesses of the board.

DRAWINGS

DESCRIPTION OF THE INVENTION

Figure 1:
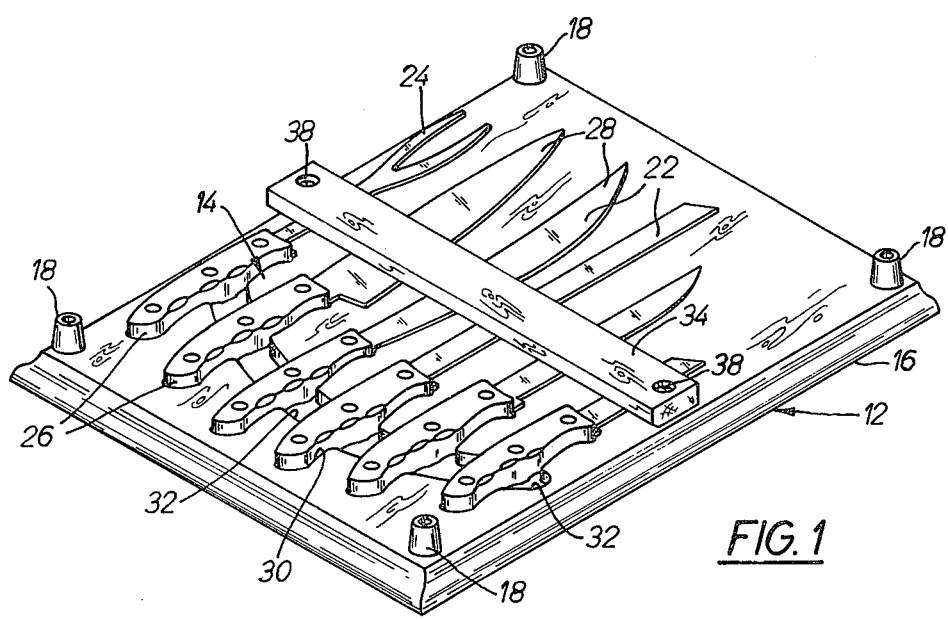
FIG. 1 is a perspective view of the combination cutlery set and cutting board.
Figure 2:
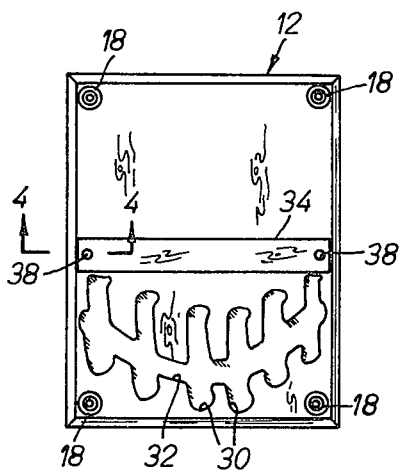
FIG. 2 is a bottom view of the cutting board showing the storage location of the cutlery set.
Figure 3:
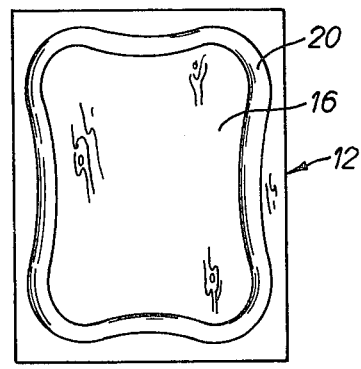
FIG. 3 is a top view of the cutting board showing the juice trough.
Figure 4:
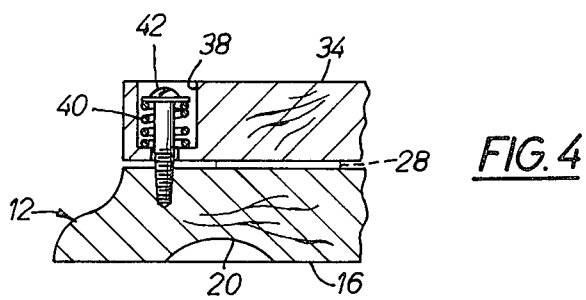
FIG. 4 is a view taken on line 4—4 of FIG. 2 showing the spring coil for the holding bar.

The combination cutlery set and cutting board generally includes a cutting board 12 and a cutlery set 14. The cutting board is provided with a cutting surface 16 on the top and a number of support members or legs 18 on the corners of the bottom. The cutting surface is defined by means of a juice trough 20 located in a spaced relation to the edge of the board.

The cutlery assembly includes a number of knives 22 and a fork 24. Each of the knives 22 and the fork 24 includes a handle 26 and a blade 28.

The cutlery set is stored on the bottom of the board in a number of recesses 30. Each of the recesses 30 is elongate in configuration and is spaced in a substantially parallel relation to the adjacent recesses. Each recess has a configuration corresponding to one of the handles of the knives or fork. An arcuate groove 32 is used to interconnect the recesses to allow for ease of removal of the knives from the board.

The cutlery set is held on the bottom of the board by means of a transverse bar or member 34. In this regard the transverse bar 34 includes an opening or recess 38 at each end to accommodate a spring coil 40. A pair of mounting screws 42 are screwed to the board through the spring coils 40 so that the coils will bias the bar into engagement with the bottom of the cutting board.

In this regard, the spring coils 40 which are located in the transverse bar 34 provide a bias sufficient to retain the cutlery set on the board. The knives and forks can be easily removed and replaced by merely inserting the blades under the bar 34.

I claim:

1. A storage assembly for a cutlery set, the cutlery set including a number of knives and a fork, each having a handle and a blade, said assembly comprising a board, a number of recesses in said board for receiving the handles of the cutlery set, a transverse bar mounted on said board in a transverse position with respect to the blades of the knives and fork, openings in each end of said bar, a pair of spring coils positioned in said openings, and a mounting screw extending through each opening into said board for retaining the coil springs in the openings, said springs being compressed by said screws for biasing the bar against the blades whereby the knives and fork can be easily removed from and replaced in the recesses of the board, and a leg at each corner of said board for supporting said board on a surface at a distance sufficient to provide clearance on the bottom of said board for said cross bar.

2. The combination of a cutlery and cutting board assembly, said assembly comprising:
 a board having a cutting surface on the top and a number of recesses on the bottom for receiving a portion of the handles of a cutlery set,
 a cross bar mounted in a transverse relation to the blades of said cutlery set for removably holding said cutlery set in said recesses in the bottom of said board, said cross bar including an opening at each end,
 a spring in each opening, mounting screws in said board extending through each spring and opening for compressing said spring to bias said bar into engagement with said board,
 and means for supporting said board at a distance from a supporting surface sufficient to store said cutlery set on the bottom of said board.

* * * * *